Dec. 20, 1938.                V. BENDIX                    2,140,731
                                BRAKE
                Original Filed July 14, 1924      2 Sheets-Sheet 1
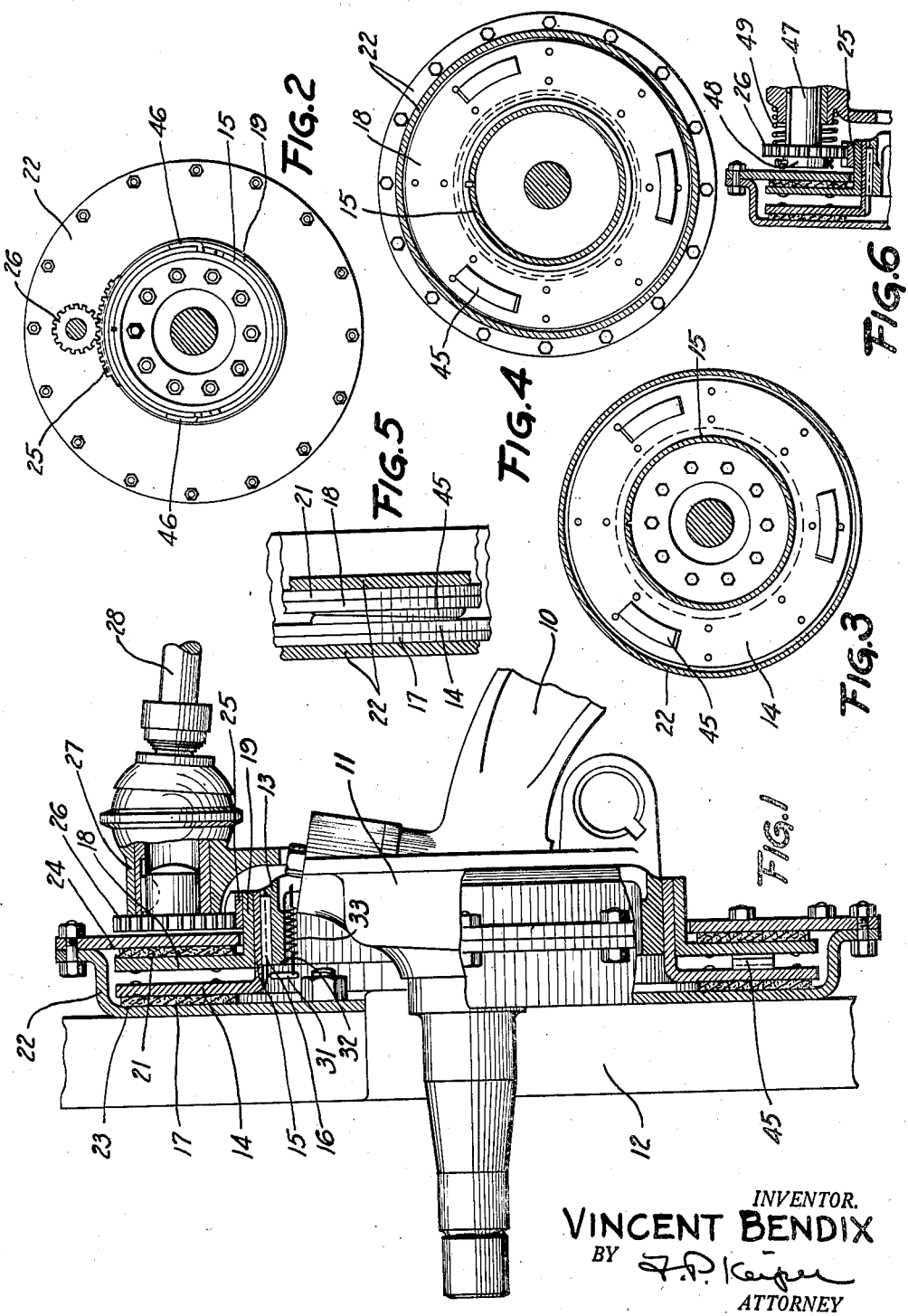
INVENTOR.
VINCENT BENDIX
BY
ATTORNEY Dec. 20, 1938.   V. BENDIX   2,140,731
BRAKE
Original Filed July 14, 1924   2 Sheets-Sheet 2

INVENTOR.
VINCENT BENDIX
BY
ATTORNEY

Patented Dec. 20, 1938

2,140,731

UNITED STATES PATENT OFFICE 2,140,731

BRAKE

Vincent Bendix, South Bend, Ind., assignor to Bendix Aviation Corporation, South Bend, Ind., a corporation of Delaware Original application July 14, 1924, Serial No. 726,050. Divided and this application January 21, 1933, Serial No. 652,962

16 Claims. (Cl. 188—72)

The invention has to do with brakes such as are particularly adaptable to road vehicles for the purpose of braking the movement of the wheels or other rotatable parts.

The brakes heretofore proposed for such adaptation have consisted, in most instances, of a cylindrical drum mounted for rotation with the wheel, and one or more braking elements mounted for movement radially of the wheel into frictional engagement with the inner or outer periphery of the drum. Numerous refinements of substantial merit have been made in the construction, arrangement and manner of operation of such brakes, as exemplified for instance in the well known Perrot brake wherein the initial coaction of the braking elements tends in itself to effect the complete coaction, but in all such brakes the braking surface available is obviously only that of the periphery of the drum, and due to the increasingly heavy traffic of road vehicles, the braking stresses which must be applied abruptly upon occasion are rapidly becoming too severe to be thus restricted in their area of application.

The principal objects of the invention are to provide an improved brake wherein the braking stresses are uniformly distributed over a relatively large braking surface, wherein the actuating stresses are neutralized within the assembly and axial thrust is thereby eliminated, wherein self-energization is had in that the initial coaction of the braking element tends in itself to effect the complete coaction, and wherein the coactable braking elements are in the form of annular friction surfaces which are arranged to engage upon movement of certain of the same axially of the assembly.

While the foregoing statement is indicative in a general way of the nature of the invention, other objects and advantages not specifically referred to herein will be evident upon a full comprehension of the simple construction, compact arrangement and efficient manner of operation of the brake as set forth in the following description and accompanying drawings, wherein is presented several preferred embodiments of the invention.

It will be understood that such embodiments are chosen primarily for the purpose of exemplification, and are not intended to restrict the spirit of the invention short of its scope as defined by the appended claims.

In the drawings:

Figure 1 is a partially sectioned side elevation of one form of the invention;

Figures 2, 3, 4 and 5 are sections taken on the lines 2—2, 3—3, 4—4, and 5—5, respectively of Figure 1;

Figure 6 is a fragmentary section corresponding in a general way to the sectioned portion of Figure 1 but showing a modification of the operating means;

Figure 8:
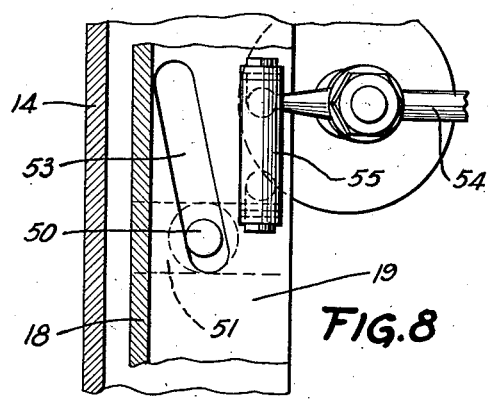
Figure 8 is a section on the line 8—8 of Figure 7.

Reference will first be made to that form of the invention illustrated in Figures 1-5 inclusive, wherein the brake is presented in association with a conventional front wheel assembly consisting of an axle 10, a spindle 11 pivoted on the axle, and a wheel 12 journalled on the spindle.

The brake includes a cylindrical mounting bracket 13 which is carried by the spindle 11, an annular disk 14 having an inner peripheral flange 15, which is sleeved over the bracket 13 and is splined thereto by a suitable key 16 for movement on the bracket axially of the assembly, an annular friction mat 17 secured to the front face of the disk 14, an annular disk 18 having an inner peripheral flange 19, which is sleeved over the flange 15 for axial sliding movement to permit separative movement of the disk 18 of the disk 14, an annular friction mat 21 secured to the rear face of the disk 18, a casing 22, which is carried by the wheel 12 and encompasses the disks 14 and 18, an annular friction surface 23 on the front disk-like wall of the casing 22 for coaction with the opposed friction mat 17 on the disk 14, another annular friction surface 24 on the rear disk-like wall of the casing 22 for coaction with the opposed friction mat 21 on the disk 18, and operating means for effecting separative movement of the disks 14 and 18 into frictional engagement with the spaced disk-like walls of the casing, each of the said disks 14 and 18 being provided upon their back sides with axial wedge cams 45 to drive the disks apart upon relative rotation. The operating means mentioned also includes a short arcuate rack 25, which is secured to the outer periphery of the flange 19 exteriorly of the casing 22, a pinion 26 which is meshed with the rack 25 and is journalled in a support 27 carried by either the spindle 11 or the bracket 13, a universally mounted rod 28 which may be supported at its other end in any convenient manner and oscillated in any suitable manner for operating the pinion 26 thereby effecting the desired relative movement of the disks 14 and 18 axially of the assembly. For convenience in assembling or disassembling the brake, the casing 22 may be formed in two axially separable parts, as shown.

When the brake is applied, the disks 14 and 18 will move into frictional engagement with the disk-like walls of the rotating casing 22 through the intermediation of the friction mats 17 and 21; the disk 14 moving axially of the assembly, and the disk 18 moving spirally of the axis of the assembly in the general direction of rotation of the casing 22, since the cams are preferably so arranged. When the friction mat 21 on the disk 18 initially contacts with the friction surface 24 on the rear disk-like wall of the casing, the frictional engagement set up by such contact will tend to continue the spiral movement of the disk 18, and will accordingly tend to effect completely the requisite frictional engagement of both of the friction mats 17 and 21 with both of the friction surfaces 23 and 24, respectively, through an obvious self-energizing action. The stresses acting on the disks axially of the assembly to effect and maintain the frictional engagement are equal in opposite directions, and are neutralized within the assembly by the floating characteristic of the mounting of the disks, which characteristic also insures a uniform distribution of the braking stresses throughout all of the several friction surfaces of the brake.

When the brake is not in operation, the disks 14 and 18 are so spaced apart as not to be in frictional engagement with the disk-like walls of the rotating casing 22, but if it is desired to prevent the disks as a unit from floating in either direction axially of the assembly into contact with the walls of the casing, centering means such as illustrated in Figure 1 may be employed. The centering means includes a stud 31 which extends inwardly from the flange 15 of the disk 14 closely adjacent the front edge 32 of the bracket 13, and a spring 33 which extends axially of the assembly between the stud 31 and a suitable attaching portion of the bracket 13. The stud and spring arrangement is preferably duplicated at a diametrically opposite portion of the brake or at equally spaced points. When the brake is applied, the studs 31 will move away from the edge 32 of the bracket, and when the brake is not in operation, the springs 33 will cause the studs 31 to move into contact with the edge 32 of the bracket, thereby acting to maintain the disks 14 and 18 in spaced relation to the walls of the casing.

If simple wedge cams 45 such as illustrated are used, the disks 14 and 18 will not be drawn together again when the flange 19 is turned in the reverse direction. In order to draw the disks together again, leaf springs 46, such as illustrated in Figure 2, may be secured in such a way to the rear edge of the flange 15 of the disk 14 as to yieldingly bear against the rear edge of the flange 19 of the disk 18.

Adjustment may be made in the brake to compensate for wear in the parts by the employment of a mounting for the pinion 26, such as that illustrated in Figure 6, wherein the pinion 26 is splined on a spindle 47 for axial movement thereon and is held normally against an enlarged end 48 of the spindle in meshed relation to the rack 25 by means of a spring 49, which will permit the pinion to be temporarily shifted axially of the spindle 47 a sufficient distance to disengage from the rack, whereupon the pinion may be turned a distance of one or two teeth, or it may be found necessary to effect the adjustment desired, and then returned to its normal position in meshed engagement with the rack.

Reference will now be made to the modified form of the invention illustrated in Figures 7 and 8.

In this form of the invention, the camming connection between the disks 14 and 18 is effected with a single pin 50 having a head movable axially of the assembly in a keyway 51 of the bracket 13 and a shank extending radially through both a round aperture 52 in the flange 15 of the disk 14 and an elongated oblique slot 53 in the flange 19 of the disk 18. The pin 50 permits the disks 14 and 18 to move freely as a unit axially of the assembly, and causes the disk 18 to move spirally of the disk 14 when rotary movement is transmitted to the flange 19 of the disk 18. The flange 19 may be moved by any of the operating means heretofore described, or by an intermediately pivoted lever 54, which connects at one of its free ends with the flange 19 by means of a universally mounted coupling link 55.

Figure 7:
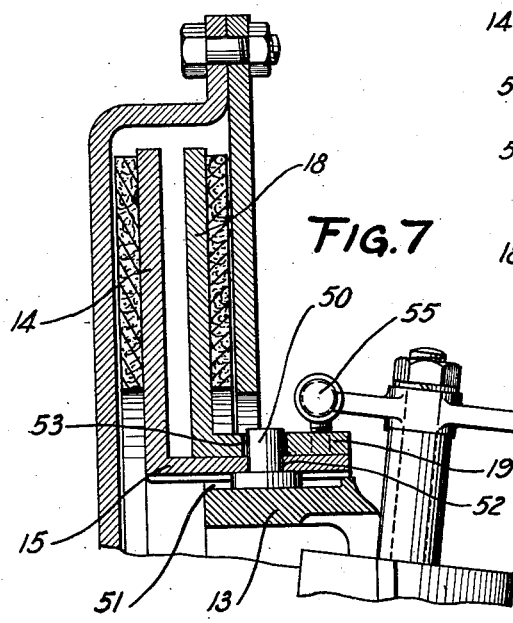
Figure 7 is a fragmentary sectional view through a modified form of the invention.
Figure 9:
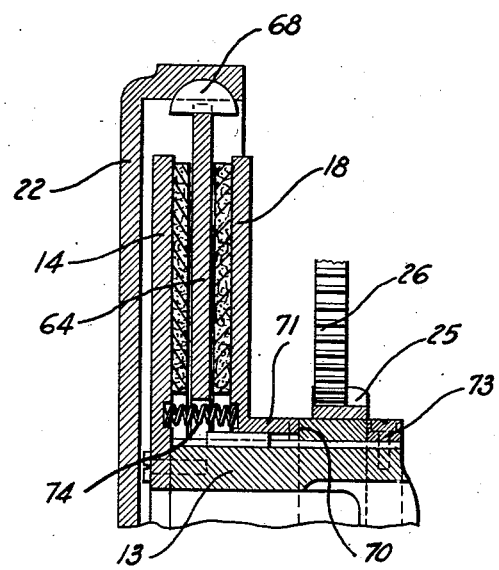
Figure 9 is a fragmentary sectional view through a further modified form of the invention.

The modified form shown in Figure 9 is similar in many respects to those of Figures 1 and 7, except that the structure is somewhat simplified. The friction surfaces instead of being the side walls of the casing 22, are formed on a disk member 64, which is keyed in the casing 22 by a key 68 of which there may be a plurality, the disk member however, being free to move axially so as to permit equalized pressures on its opposed surfaces. A friction disk 14 is rigidly secured to the end of the support sleeve 13 and splined on the body of the support sleeve 13 is a second brake disk 18 which has a short sleeve 71. A rotatable collar having a rack 25 adapted to engage the teeth of a pinion 26 is secured in place on the sleeve support 13 by a shoulder formed by a collar member 73. The end face of the rotatable collar is provided with inclined spiral wedge cams 70 which in turn are adapted to engage complementary cam surfaces on the end of the sleeve 71. Actuation of the brake results from a rotation of the collar carrying the rack 25, which through its cam surfaces thrusts the disk 18 into engagement with the disk 64. To insure complete release, springs such as 74, may be provided.

In each of the several forms of the invention, it will be recognized that a non-rotatable part is present in the bracket 13 of the spindle, or in a plurality of braking elements associated with such non-rotatable part are present in the friction surfaces of the disks 14 and 18 or of the mats associated with the disks; that a rotatable part is present in the casing 22; and that a plurality of braking elements associated with such rotatable part are present in the friction surfaces of the disk-like walls of the casing 22 or the disk 64 carried thereby, and that wedge cams of various forms are employed for the purpose of actuating the brake.

The expression "braking elements" as used in the claims defines essentially the frictional surfaces, and it is immaterial whether the frictional engagement between such surfaces is had by direct contact or by the intermediation of friction mats, either attached or floating. The expression "movable spirally of the axis" defines a combined axial and rotary movement which is not necessarily of uniform progress in either direction may vary, for instance, as the movement imparted by a curved cam.

This application is a division of Patent No. 1,906,733, issued May 2, 1933.

What is claimed is:

1. A brake comprising a pair of rotatable spaced brake disks, a stationary support sleeve, a pair of friction disks having telescopic sleeves mounted upon said support sleeve and adapted to engage said spaced brake disks, a pin secured in an aperture in one of the brake disk sleeves and extending in one direction into a longitudinal keyway in said support sleeve, and into an inclined slot in the other brake disk sleeve, and actuating means for rotating the slotted sleeve, to apply the brake.

2. A brake comprising a pair of rotatable spaced brake disks, a stationary support sleeve, a pair of friction disks having telescopic sleeves mounted upon said support sleeve, and adapted to engage said spaced brake disks, means for keying one of said friction disk sleeves against rotation with respect to said support sleeve, and means including a plurality of interengaging cam surfaces for forcing said friction disks into engagement with said brake disks upon rotation of one friction disk relative to the other.

3. A brake comprising a pair of disk braking surfaces, a stationary support sleeve, a pair of friction disks adapted to engage said braking surfaces, one of said friction disks being fixed against rotation relative to said support sleeve and supported off the end of said sleeve, and the other being adapted to move toward and away from said first disk, and having a cylindrical flange overlying said sleeve and actuating means including a plurality of wedge cams for frictionally engaging said friction disks with said braking surfaces.

4. A brake comprising a support, a friction disk secured adjacent one end thereof, a friction disk having a sleeve axially slidably secured on said support, an annular revolvable brake disk located between said friction disks, cam faces on one edge of said sleeve, and actuating means engaging said cam faces adapted to move the friction disks convergently.

5. A disk brake comprising a support, a pair of friction disks having telescopic sleeves mounted on said support, means for restricting one of said sleeves to axial movement with respect to said support and for restricting the other of said sleeves to spiral movement with respect to the former.

6. A disk brake comprising a support, a pair of friction disks having telescopic sleeves mounted on said support, a longitudinal keyway in said support, an aperture in one of said sleeves, a spiral slot in the other and a pin passing through said slot and aperture and extending into said keyway.

7. A disk brake comprising a pair of relatively movable friction disks, means for moving said disks relative to one another including a pair of intermeshing gears, a spindle for one of said gears, and means for resiliently maintaining the gear on the spindle in position to mesh with the other gear.

8. In a brake, an actuating means including a pair of interengaging gears, a spindle upon which one of said gears is splined, a shoulder on the shaft against which the one gear may rest when in engagement with the other gear, and resilient means for maintaining said one gear against the shoulder, whereby the gear may be moved axially out of engagement and rotated relative to the other gear for adjustment thereof.

9. A disk brake comprising a pair of friction disks having telescopic sleeves thereon, and resilient means secured to one of said sleeves and bearing on the other.

10. A disk brake comprising a support, a friction disk having a sleeve sleeved on said support, a second friction disk having a sleeve telescopically arranged on said first sleeve, resilient means for urging said first disk relative to the support and resilient means for urging said second disk relative to the first.

11. A disk brake comprising a cylindrical support, a friction disk having a sleeve keyed on said support for axial movement, a fixed collar on said support spaced from said sleeve, and a rotatable ring between said collar and sleeve, said rotatable ring and sleeve having complementary cams arranged around the adjacent edges thereof.

12. A disk brake comprising a support, a friction disk having a sleeve sleeved on said support, a second friction disk having a sleeve telescopically arranged on said first sleeve, and means splined in said support extending into an aperture in one sleeve and an inclined slot in the other.

13. A disk brake comprising a support, a friction disk having a sleeve sleeved on said support, a second friction disk having a sleeve telescopically arranged on said first sleeve, means splined in said support extending into an aperture in one sleeve and an inclined slot in the other, and means for rotating the sleeve having the inclined slot.

14. A disk brake comprising a cylindrical support, a friction disk having a sleeve keyed on said support for axial movement, a friction disk secured to said support, resilient means between said disks urging them in opposite directions, a shoulder on said support spaced from said sleeve, and a rotatable ring having a cam thereon complementary to a cam arranged on said sleeve, for moving said sleeve axially upon rotation of said ring.

15. A disk brake comprising a support, a friction disk having a sleeve splined on said support for axial movement relative thereto, a second friction disk having a sleeve telescopically arranged on said first named sleeve, interengaging complementary wedge members mounted upon the opposed sides of said friction disks, and means for rotating said second named sleeve.

16. A disk brake comprising a support, a friction disk having a sleeve splined on said support for axial movement relative thereto, a second friction disk having a sleeve telescopically arranged on said first named sleeve, means for spreading said friction discs upon rotation of one relative to the other, a segmental gear carried on said second named sleeve, a pinion meshed therewith, a shaft splined to said pinion and carried in a bearing mounted on said support, a shoulder on said shaft against which said pinion rests when in engagement with said segmental gear and a resilient means for axially urging said pinion into engagement with said shoulder, and means for rotating said second named sleeve.

VINCENT BENDIX.